US006441323B1

(12) United States Patent
Montagnino et al.

(10) Patent No.: US 6,441,323 B1
(45) Date of Patent: Aug. 27, 2002

(54) SPACE SAVING FOLDING SCALE

(76) Inventors: James G. Montagnino, 2503 Dunham Woods Ct., St. Charles, IL (US) 60174; Ricardo Murguia, 1909 S. Wisconsin, Berwyn, IL (US) 60402; Anson Wong, 1501 Club Dr., Glendale Heights, IL (US) 60139

( * ) Notice: Subject to any disclaimer, the term of this patent is extended or adjusted under 35 U.S.C. 154(b) by 0 days.

(21) Appl. No.: 09/675,520

(22) Filed: Sep. 29, 2000

(51) Int. Cl.$^7$ .......................... G01G 21/00; G01G 21/28
(52) U.S. Cl. ...................................... 177/126; 177/127
(58) Field of Search ........................ 177/126, 127, 177/142; D10/92

(56) References Cited

U.S. PATENT DOCUMENTS

| | | | | | |
|---|---|---|---|---|---|
| 1,887,986 A | * | 11/1932 | Baldwin | ...... | 177/126 |
| 2,181,272 A | * | 11/1939 | Greenleaf | ...... | 177/126 |
| 2,441,037 A | * | 5/1948 | Sherrin | ...... | 177/126 |
| D183,069 S | * | 6/1958 | Spear | ...... | D10/92 |
| 2,872,178 A | * | 2/1959 | Holland | ...... | 177/126 |
| 2,924,443 A | * | 2/1960 | Townsend et al. | ...... | 177/126 |
| 3,097,712 A | * | 7/1963 | Johnson | ...... | 177/126 |
| 4,288,131 A | * | 9/1981 | Griffin | ...... | 177/142 |
| 4,351,505 A | * | 9/1982 | Wickersham | ...... | 248/316 D |
| 5,886,302 A | * | 3/1999 | Germanton et al. | ...... | 177/199 |
| 5,955,705 A | * | 9/1999 | Germanton | ...... | 177/126 |
| D451,834 S | * | 12/2001 | Montagnino et al. | ...... | D10/92 |

* cited by examiner

Primary Examiner—Randy W. Gibson
(74) Attorney, Agent, or Firm—Kramer, Levin, Naftalis & Frankel LLP

(57) ABSTRACT

A space saving folding scale includes a frame, a measurement device, an opening mechanism and a display. The frame includes a base, lateral supports attached to the base, and a horizontal support attached to the lateral supports. The horizontal support includes a handle. The measurement device includes a weighing mechanism and a case housing the weighing mechanism. The opening mechanism is attached to the case and the frame so as to permit the measurement device to alternate between vertical and horizontal positions. The display is coupled to the measurement device and located at any easily visible location on the scale when the measurement device is ready for use in the horizontal position, such as on the horizontal support, the handle, or a top surface of the weighing mechanism. The display may be digital or analog.

23 Claims, 4 Drawing Sheets

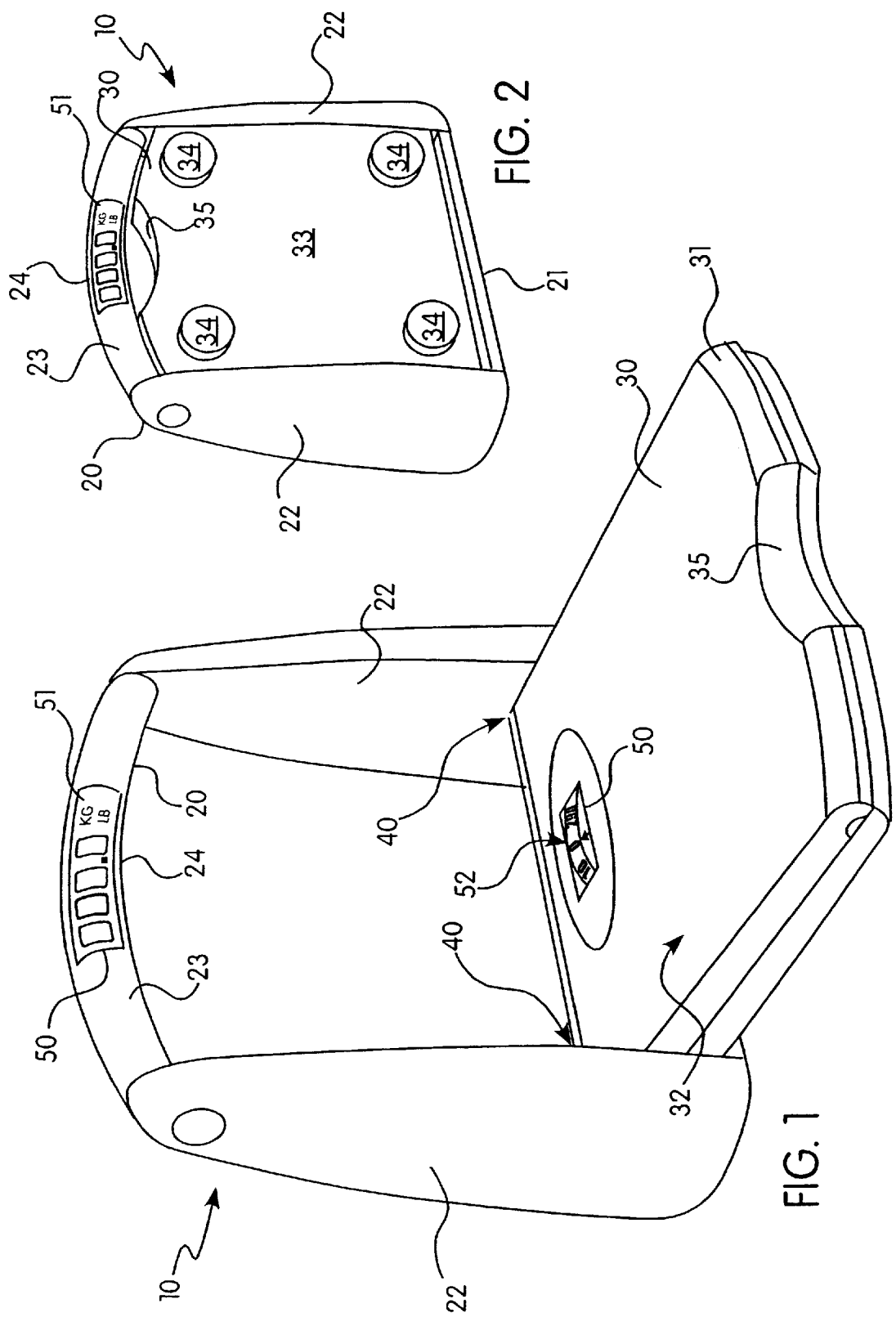

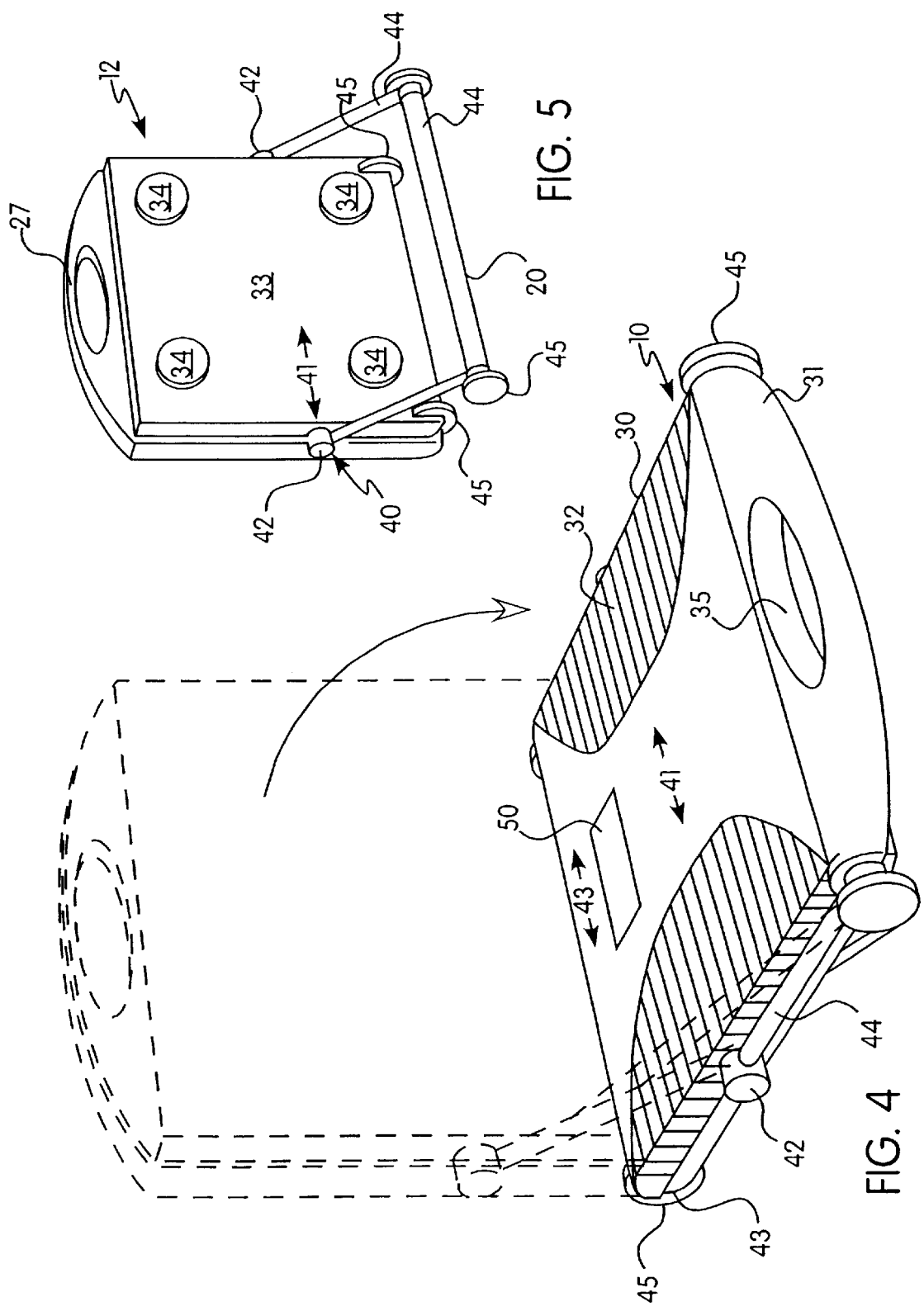

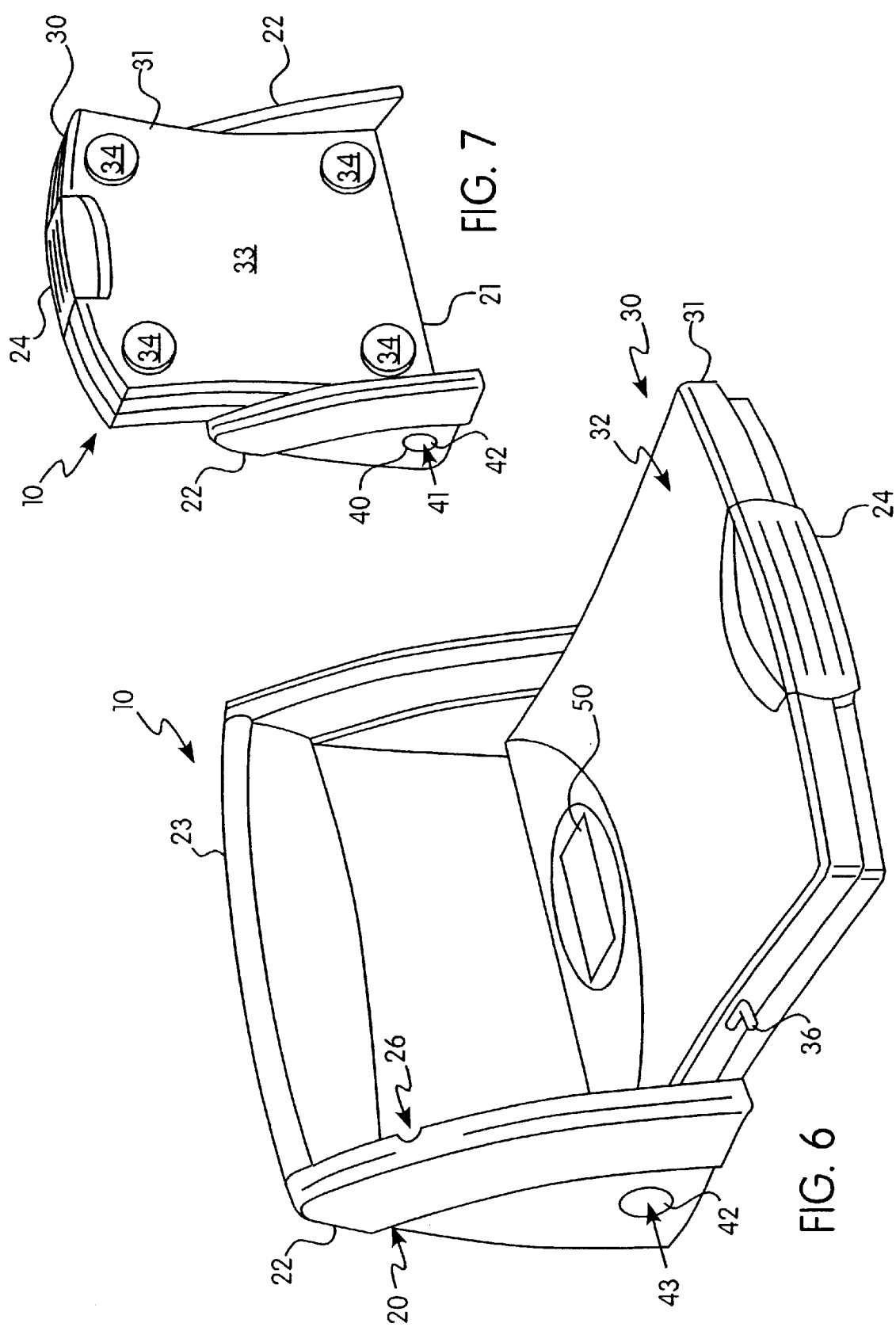

SPACE SAVING FOLDING SCALE

FIELD OF THE INVENTION

The present invention relates to weight scales, and more specifically to a space saving folding scale.

BACKGROUND INFORMATION

Weight scales are well-known in the art. A scale may use one of a variety of weighing mechanisms to measure weight, but most commonly-used weighing mechanisms require placement of the scale on a hard, flat surface such as a bathroom floor. A typical scale is at least 12"×12"×2.5" and is kept flat on a bathroom floor. A scale is a common accessory to a bathroom, and many people weigh themselves in the privacy of their bathrooms before or after bathing. However, many people have small bathrooms with limited floor space on which to keep a scale. Insofar as the average scale occupies at least a 12"×12" space on the bathroom floor, storing the average scale in the limited space between a shower or bath, sink and toilet may be inconvenient and impractical in a small bathroom.

In addition, many people consider a scale to be unattractive and unsightly, but nonetheless a necessary bathroom appliance. While many people would prefer to not have a scale be visible in their bathrooms, these people simply may tolerate having a scale be visible for the lack of a better alternative. Although most people have an option to store the scale in a closed cabinet, placing it out of sight, this sort of storage is an inconvenience to the user and may become quite annoying, especially if the scale is heavy, as is often the case, and the user weighs himself daily.

It would therefore be desirable to create a scale that occupies a minimal amount of floor space when not in use and that does not have an unsightly appearance resembling a scale when not in use. Furthermore, it would be desirable to create a scale that is more easily transported.

SUMMARY OF THE INVENTION

The present invention relates to weight scales. In particular, the invention provides a space saving, folding weight scale that when not in use occupies much less space than an ordinary weight scale and does not have the unsightly appearance of a weight scale. A space saving folding scale according to the present invention may include a frame, a measurement device, an opening mechanism and a display.

The frame may include a base, lateral supports attached to the base, and a horizontal support attached to the lateral supports. The horizontal support may include a handle. The measurement device may include a weighing mechanism and a case housing the weighing mechanism. The case may be separate from or part of the frame. The weighing mechanism may be any suitable weighing mechanism known in the art. The opening mechanism may be attached to the case and the frame so as to permit the measurement device to alternate between vertical and horizontal positions. The opening mechanism may be manual or automatic and may include, for example, hinges, levers, rollers, tracks, or pulleys, providing a smooth opening while preventing free fall of the measurement device. The display may be incorporated at any easily visible location on the scale when the measurement device is ready for use in the horizontal position. For example, the display may be placed on the horizontal support, the handle, or a top surface of the weighing mechanism.

BRIEF DESCRIPTION OF THE DRAWINGS

FIG. 1 is an elevational perspective view of an exemplary folding scale according to an exemplary embodiment of the present invention in a horizontal position.

FIG. 2 is an elevational perspective view of an exemplary folding scale according to the exemplary embodiment of the present invention in a vertical position.

FIG. 4 is an elevational perspective view of an exemplary folding scale according to a further embodiment of the present invention in the horizontal position.

FIG. 5 is an elevational perspective view of an exemplary folding scale according to the further embodiment of the present invention in the vertical position.

FIG. 6 is an elevational perspective view of an exemplary folding scale according to yet a further embodiment of the present invention in the horizontal position.

FIG. 7 is an elevational perspective view of an exemplary space saving folding scale according to the yet further embodiment of the present invention in the vertical position.

Figure 3:
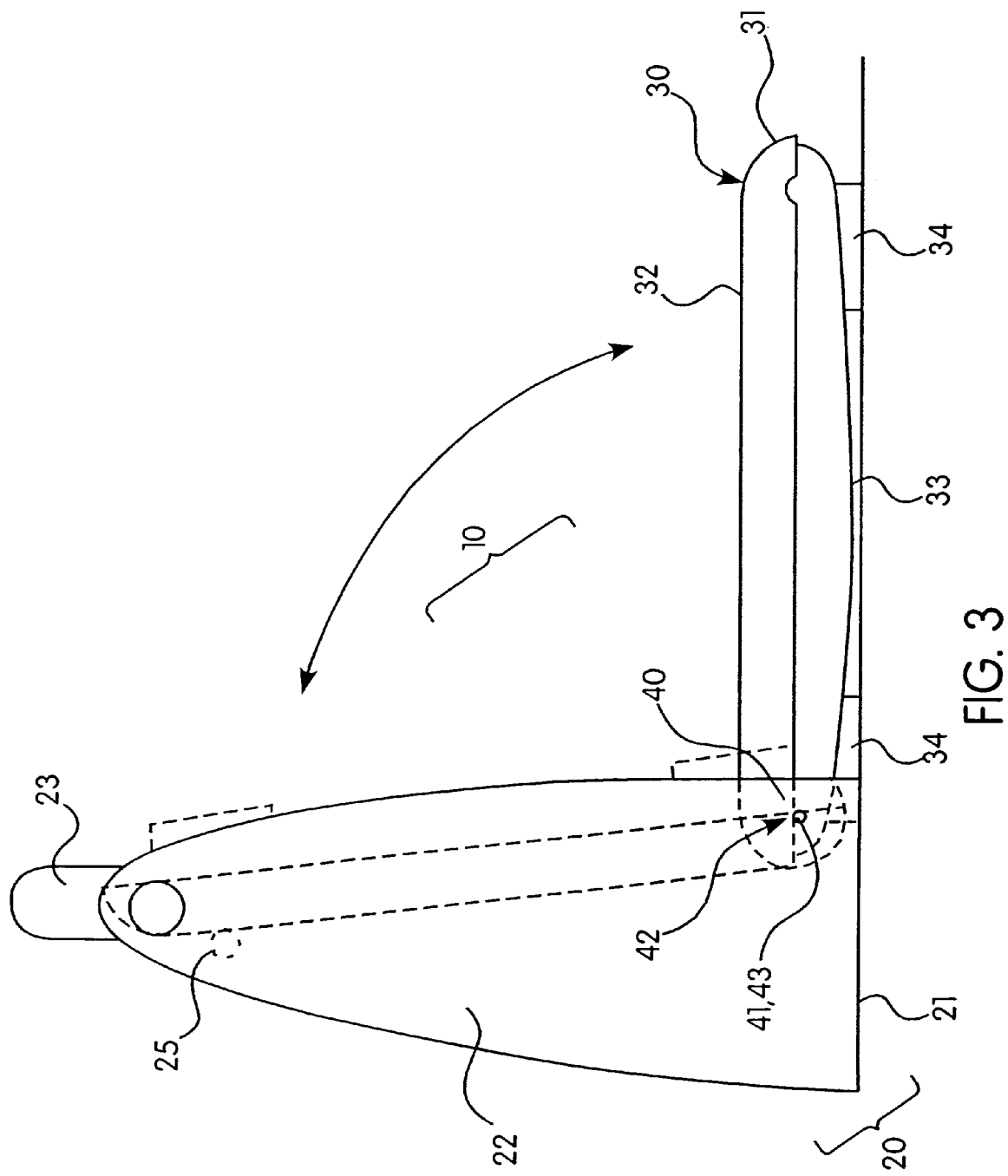
FIG. 3 is a side view of an exemplary folding scale according to an embodiment of the present invention in the horizontal position.

Other features and advantages of the present invention will be apparent from the following description of the exemplary embodiments thereof, and from the claims.

DETAILED DESCRIPTION

Beginning with FIG. 1, FIG. 1 shows an elevational perspective view of an exemplary space saving folding scale 1 according to an embodiment of the present invention in a horizontal position. The space saving folding scale 10 may include a frame 20, a measurement device 30, an opening mechanism 40 and a display 50.

The frame 20 may include a base 21, lateral supports 22 attached to the base 21, and a horizontal support 23 attached to the lateral supports 22. The frame 20 may be made of any suitable material, for example, plastic, wood, metal, or glass. The horizontal support 23 may include a handle 24.

The measurement device 30 may include a weighing mechanism (not shown) and a case 31 housing the weighing mechanism. The case 31 may be separate from or part of the frame 20. The case 31 may be made of any suitable material, for example, plastic, wood, metal, or glass. The weighing mechanism may be any suitable weighing mechanism known in the art, including mechanical and/or electronic implementations, such as springs or load cells (e.g., strain gauges or electronic sensors). The weighing mechanism may connect to a power source (not shown), if necessary, such as, for example, batteries, a power outlet, or solar cells. Batteries may be recharged by connection to, for example, a power outlet or solar cells.

The opening mechanism 40 may be attached to the case 31 and the frame 20 so as to permit the measurement device 30 to alternate between vertical and horizontal positions. The opening mechanism 40 may be manual or automatic and may include, for example, hinges, levers, rollers, tracks, or pulleys. The opening mechanism 40 may be actuated by either a user's hand or foot. The opening mechanism may use a braking mechanism, such as a counter balance, a pulley, or a friction clutch hinge, to allow a smooth transition during opening to prevent the measurement device from free-falling.

The display 50 may be incorporated at any easily visible location on the scale 1 when the measurement device 30 is ready for use in the horizontal position. For example, the display 50 may be placed on the horizontal support 23, the handle 24, or a top surface 32 of the measurement device 30. The display 50 may be a digital display 51 or an analog display 52. A digital display 51 may include, for example, a liquid crystal display (LCD) or light-emitting diodes (LED). An analog display 52 may include, for example, a rotating dial or a rotating indicator.

Measurement device 30 also has an underside 33 that may have feet 34. Feet 34 may be adjustable for leveling purposes. Feet 34 may be simple pads, if using, for example, strain gauges, or feet 34 may be load cells if using electronic sensors. When using a load cell weighing mechanism, it is feasible to use one or more load cells distributed between underside 33 and base 21. Typical configurations may include: four load cell feet 34 on underside 33 and none on base 21; two load cell feet 34 on underside 33 and two load cell feet 34 on base 21; two load cell feet 34 on underside 33 and none on base 21; and one load cell foot 34 on underside 33 and none on base 21.

FIG. 2 is an elevational perspective view of an exemplary space saving folding scale 10 according to an embodiment of the present invention in a vertical position. The case 31 may have a curved indentation 35 opposite the handle 24 so that a user may insert the user's hand into a space between the indentation 35 and the handle 24 in order to grasp the scale 10 to carry it. When in the vertical position, the underside 33 may be visible. As a decorative alternative to exposing the underside 33, the underside 33 may be covered by decorative furnishings, such as, for example, wallpaper, paint, leather, colored plastic, paneling or tile matching the decor of the bathroom. If done properly, the decorative furnishings of the underside 33 should not interfere with the accuracy of the measurement device 30.

FIG. 3 is a side view of an exemplary space saving folding scale 1 according to an embodiment of the present invention in the horizontal position. The base 21 and lateral supports 22 are wide enough to stabilize the scale 10 when the measurement device 30 is in the vertical position. Several methods exist to keep the measurement device 30 in the vertical position.

For example, the measurement device 30 may fit snuggly against the lateral supports 22 and/or the horizontal support 23 in the vertical position, which form, for example, a molded plastic detent. There possibly may be, for example, a spring detent, a latch detent or a lock holding the measurement device 30 in place. There may be a brace 25 keeping the measurement device 30 from leaning too far back. Or the opening mechanism 40 may limit the movement of measurement device 30 such that it can only move between a stable vertical position and a stable horizontal position. For example, incorporation of spring-loaded friction pivots would prevent the measurement device from free-falling.

FIGS. 4 and 5 are elevational perspective views of an exemplary space saving folding scale according to another embodiment of the present invention in the horizontal and vertical positions, respectively. As is evident in comparison to FIGS. 1–3, the scale of FIGS. 4 and 5 includes a frame 20 and a measurement device 30 that are arranged differently from the exemplary scale 1 shown in FIGS. 1 and 2. Consequently, handle 24 is integrated into case 31. In FIGS. 4 and 5, the frame 20 acts as an extension of opening mechanism 40. Likewise, opening mechanism 40 acts not only to rotate the measurement device 30 from the vertical position to the horizontal position, but also to support the measurement device 30 in the vertical position.

The opening mechanism 40 of FIGS. 4 and 5 is necessarily more complex than that of FIGS. 1–3 which may be considered an axially hinged mechanism, i.e., an axis of rotation 41 of a hinge 42 corresponds to an axis of rotation 43 of the measurement device 30. The opening mechanism 40 of FIGS. 4 and 5 includes a non-axially hinged mechanism in that the axis of rotation 41 of the hinge 42 does not correspond to the axis of rotation 43 of the measurement device 30. The hinge 42 may be connected to a support bar 44 that may pivot between the vertical position and the horizontal position. When rotated to the vertical position, the support bar 44 may lock in place to support the scale 10. The case 31 may be supported by wheels 45 at the axis of rotation 43 to facilitate the rotation of the measurement device 30, and support bar 44 may include wheels 45 to facilitate the pivoting motion of support bar 44.

FIGS. 6 and 7 are elevational perspective views of an exemplary space saving folding scale according to another embodiment of the present invention, respectively in the horizontal position and in the vertical position. In this embodiment, the lateral supports 22 are not as high as the measurement device is long. Because the horizontal support 23 in FIGS. 6 and 7 is lower than in the embodiment of FIGS. 1–3, the handle 24 has been placed on the case 31. The display 50 likewise is on the top surface 32 of the measurement device 30. The case 31 may include a stud 36 that fits in a groove 26 formed in lateral support 22 to hold the measurement device 30 in the vertical position. As in FIGS. 1-3, opening mechanism 40 of FIGS. 6 and 7 may include a hinge 42 that has an axially-hinged axis of rotation 41 corresponding to the axis of rotation 43 of the measurement device 30.

A number of embodiments of the present invention have been described above. Nevertheless, it will be understood that various modifications may be made without departing from the spirit and scope of the invention. Accordingly, other embodiments may be within the scope of the following claims. It is intended that all matter contained in the above description or shown in the accompanying drawings shall be interpreted as illustrative and not in a limiting sense. It is also understood that the following claims are intended to cover all of the generic and specific features of the invention herein described and all statements of the scope of the invention, expressed or implied.

What is claimed is:

1. A portable scale comprising:
    a portable frame, the frame including a self-contained support structure,
    a measurement device connected to the frame,
    an opening mechanism connected to the frame and the measurement device, and
    a display coupled to the measurement device and attached to one of the frame and the measurement device;
    wherein the opening mechanism permits the measurement device to rotate between a vertical position and a horizontal position, the support structure maintains the frame in the vertical position while the measurement device is in the vertical position, the measurement device is operable in the horizontal position, and the scale occupies less floor space in the vertical position than in the horizontal position.

2. The scale as in claim 1, wherein the frame includes a base, lateral supports attached to the base, and a horizontal support attached to the lateral supports.

3. The scale as in claim 2, wherein the horizontal support includes a handle.

4. The scale as in claim 1, wherein the measurement device includes a weighing mechanism and a case housing the weighing mechanism.

5. The scale as in claim 4, wherein the weighing mechanism includes one of a spring mechanism or an electronic sensor mechanism.

6. The scale as in claim 2, wherein the opening mechanism includes one of a hinge, a lever, a roller, a track, and a pulley, and the opening mechanism includes a braking mechanism to prevent the measurement device from free-falling from the vertical position to the horizontal position.

7. The scale as in claim 2, wherein the display is placed on one of the horizontal support and a top surface of the measurement device.

8. The scale as in claim 1, wherein the display comprises a digital display or an analog display.

9. The scale as in claim 4, wherein the case of measurement device has an underside that has at least one foot.

10. The scale as in claim 9, wherein the at least one foot comprises a load cell.

11. The scale as in claim 9, wherein the underside is adapted to receive decorative furnishings.

12. The scale as in claim 3, wherein the measurement device has a curved indentation opposite the handle, the curved indentation creating a space between the indentation and the handle through which a user may insert a hand to grasp the handle.

13. The scale as in claim 1, the scale further comprising a detent operating on the opening mechanism to limit the movement of the measurement device between the vertical position and the horizontal position, the scale being stable and self-supporting in the vertical position and in the horizontal position.

14. The scale as in claim 13, wherein the detent includes one of a latch, a lock, a brace, a stud, and a cam.

15. The scale as in claim 4, wherein the frame and the case move in unison between the horizontal position and the vertical position.

16. The scale as in claim 15, wherein a handle is integrated into one of the frame and the case.

17. The scale as in claim 15, wherein the opening mechanism stabilizes the measurement device in the vertical position.

18. The scale as in claim 15, wherein the opening mechanism includes a non-axially hinged mechanism having a hinge connected to a support bar, the non-axially hinged mechanism being capable of pivoting between the vertical position and the horizontal position.

19. The scale as in claim 18, wherein the support bar may lock in place to support the measurement device when the measurement device is rotated to the vertical position.

20. The scale as in claim 19, wherein the measurement device includes a base supported by wheels to facilitate the rotation of the measurement device, and the support bar includes wheels to facilitate pivoting motion of the support bar.

21. The scale as in claim 3, wherein the lateral supports are not as high as the measurement device is long, the handle is arranged on the case, and the display is on a top surface of the measurement device.

22. The scale as in claim 4, wherein the frame is made primarily of wood, plastic, glass or metal, and the case is made primarily of wood, plastic, glass or metal.

23. The scale as in claim 1, wherein the measurement device and the display are coupled to a power source, and the power source includes a power outlet, a battery or a solar cell.

* * * * *